(12) United States Patent
Johnson et al.

(10) Patent No.: US 9,417,454 B2
(45) Date of Patent: Aug. 16, 2016

(54) AUTOSTEREOSCOPIC DISPLAY DEVICE (75) Inventors: Mark Thomas Johnson, Arendonk (BE); Bart Kroon, Eindhoven (NL); Philip Steven Newton, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 108 days.

(21) Appl. No.: 14/237,566

(22) PCT Filed: Aug. 17, 2012

(86) PCT No.: PCT/IB2012/054189
§ 371 (c)(1),
(2), (4) Date: Feb. 7, 2014

(87) PCT Pub. No.: WO2013/027162
PCT Pub. Date: Feb. 28, 2013

(65) Prior Publication Data
US 2015/0301342 A1  Oct. 22, 2015

Related U.S. Application Data (60) Provisional application No. 61/526,723, filed on Aug. 24, 2011.

(51) Int. Cl.
*G06T 15/00* (2011.01)
*G02B 27/22* (2006.01)
*H04N 13/04* (2006.01)

(52) U.S. Cl.
CPC ........ *G02B 27/2214* (2013.01); *H04N 13/0404* (2013.01)

(58) Field of Classification Search
CPC .......... H04N 13/0404; H04N 13/0418; H04N 13/047; H04N 13/0497; G02B 27/2214; G02B 27/22; G06F 3/01; G01J 5/0896
USPC .......... 345/419, 420, 422, 102, 158
See application file for complete search history.

(56) References Cited

U.S. PATENT DOCUMENTS

| 4,734,779 A | * | 3/1988 | Levis | H04N 9/12 345/1.3 |
|---|---|---|---|---|
| 5,483,254 A | | 1/1996 | Powell | |
| 6,064,424 A | * | 5/2000 | van Berkel | G02B 27/2214 348/42 |
| 6,618,093 B1 | * | 9/2003 | Levy | H04N 5/2253 348/374 |
| 7,301,587 B2 | * | 11/2007 | Uehara | G02F 1/133526 348/E13.028 |
| 8,325,297 B2 | * | 12/2012 | Uehara | G02F 1/133526 349/113 |
| 9,041,642 B2 | * | 5/2015 | Smoot | H04N 13/0404 345/102 |
| 2002/0075566 A1 | | 6/2002 | Tutt et al. | |
| 2002/0079834 A1 | | 6/2002 | Dai et al. | |
| 2002/0117605 A1 | | 8/2002 | Alden | |
| 2008/0266387 A1 | | 10/2008 | Krijn et al. | |
| 2010/0039698 A1 | | 2/2010 | Robinson et al. | |
| 2011/0122329 A1 | | 5/2011 | Broughton et al. | |

FOREIGN PATENT DOCUMENTS

| CN | 102026006 A | 4/2011 |
|---|---|---|
| JP | 2005181892 A | 7/2005 |
| JP | 2010117398 A | 5/2010 |
| WO | 9910766 A1 | 3/1999 |
| WO | 0248755 A2 | 6/2002 |
| WO | 2011037830 A1 | 3/2011 |

* cited by examiner

Primary Examiner — Phu K Nguyen (57) ABSTRACT

An autostereoscopic display device uses an electroluminescent display. A set of pixels is provided beneath lenticular lenses, with a plurality of pixels across the lens width direction. The pixels across the lens width direction are arranged with at least two different heights over the substrate. This enables the pixels to define a non-planar array, and they can follow the area to which light is focused by the lenticular lenses.

17 Claims, 5 Drawing Sheets

AUTOSTEREOSCOPIC DISPLAY DEVICE

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceive a stereo image in his/her eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

Known autostereoscopic displays use liquid crystal displays to generate the image.

When developing an LCD based auto-stereoscopic display, a compromise is made when designing the lenticular lens as to which sub-pixels under the lens are in focus and which are not. Only a subset of the pixels can be in focus and the remainder are slightly de-focussed. This problem is inherent to an LCD as the liquid crystal layer is typically only 3-4 microns thick and is physically confined by two flat glass plates. The LCD is a light shutter and therefore does not change the focussing, and the light sources for the lens are always situated in a single plane.

There is increasing interest in the use of organic light emitting diode (OLED) displays generally, as these do not need polarizers, and potentially they should be able to offer increased efficiency since the pixels are turned off when not used to display an image, compared to LCD panels which use a continuously illuminated backlight. Traditional OLED displays also have all pixels in a single plane, so that the problem of poor focus is also present in such displays.

This invention is based on the use of an OLED or other thin film emissive display such as an electroluminescent display within an autostereoscopic display system, and makes use of the additional design flexibility offered by these displays, in order to address the problem of out of focus pixels beneath the lenses of an autostereoscopic display.

SUMMARY OF THE INVENTION

According to the invention, there is provided an autostereoscopic display device comprising:
  an electroluminescent display arrangement comprising an array of spaced pixels over a substrate;
  an autostereoscopic lens arrangement comprising a plurality of lenticular lenses over the display arrangement,
  wherein a set of pixels is provided beneath each lenticular lens, with at least two pixels across the lens width direction, wherein the pixels across the lens width direction are arranged with at least two different heights over the substrate.

This arrangement positions the light emitting pixel surfaces at different heights over a substrate, so that they can be positioned closer to the focal curve/surface of the lenticular lens. Thus, the pixels are preferably positioned at heights corresponding to the focal surface of the lenticular lens.

The lenticular lenses preferably extend in a pixel column direction or are inclined at an acute angle to the pixel column direction, wherein each lens covers a plurality of pixel columns.

The height difference between the highest pixel over the substrate and the lowest pixel over the substrate is preferably less than 30% of the pixel width in the lenticular lens width direction. This is enough to be able to track the lens focal curve, but is simple to manufacture. The height difference between the highest pixel over the substrate and the lowest pixel over the substrate is preferably more than 1% of the pixel width in the lenticular lens width direction. Thus, the height difference is more than may result from manufacturing tolerances.

The electroluminescent display arrangement can comprise an array of reflective anodes over the substrate, an array of electroluminescent layer portions over the anodes, and an array of transparent cathodes over the electroluminescent layer portions. This defines a top emitting structure. In this case, the electroluminescent portions are between the substrate and the lens arrangement.

Instead, the electroluminescent display arrangement can comprise an array of transparent anodes over the substrate, an array of electroluminescent layer portions over the anodes, and an array of reflective cathodes over the electroluminescent layer portions. This defines a bottom emitting structure. In this case, the substrate is between the electroluminescent portions and the lens arrangement.

The substrate can be planar and the device can then comprise spacers between at least some of the pixels and the substrate to define the different heights. Alternatively, the substrate can have a non-planar shape thereby to define the different heights.

The invention also provides a method of displaying autostereoscopic images, comprising:

generating a pixellated image using an electroluminescent display arrangement comprising an array of spaced pixels over a substrate; and directing different sub-images to different directions using an autostereoscopic lens arrangement comprising a plurality of lenticular lenses over the display arrangement, wherein a set of pixels is provided beneath each lenticular lens, with at least two pixels across the lens width direction, wherein the method further comprises positioning the pixels across the lens width direction with at least two different heights over the substrate.

The invention also provides a method manufacturing an autostereoscopic display device, comprising:

forming an electroluminescent display arrangement comprising an array of spaced pixels over a substrate;

providing an autostereoscopic lens arrangement comprising a plurality of lenticular lenses over the display arrangement, wherein a set of pixels is provided beneath each lenticular lens, with at least two pixels across the lens width direction, wherein the method comprises arranging the pixels across the lens width direction with at least two different heights over the substrate.

The different heights can be provided by a number of methods, including:

providing spacers between at least some of the pixels and a planar substrate; or forming the electroluminescent display arrangement over a contoured substrate; or forming the electroluminescent display arrangement over a planar substrate and subsequently forming a contour.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides an autostereoscopic display device using an electroluminescent display, wherein a set of pixels is provided beneath lenticular lenses, with a plurality of pixels across the lens width direction. The pixels across the lens width direction are arranged with at least two different heights over the substrate. This enables the pixels to define a non-planar array, and they can follow the area to which light is focused by the lenticular lenses.

Before describing the invention, the basic operation of a known 3D autostereoscopic display will first be described.

Figure 1:
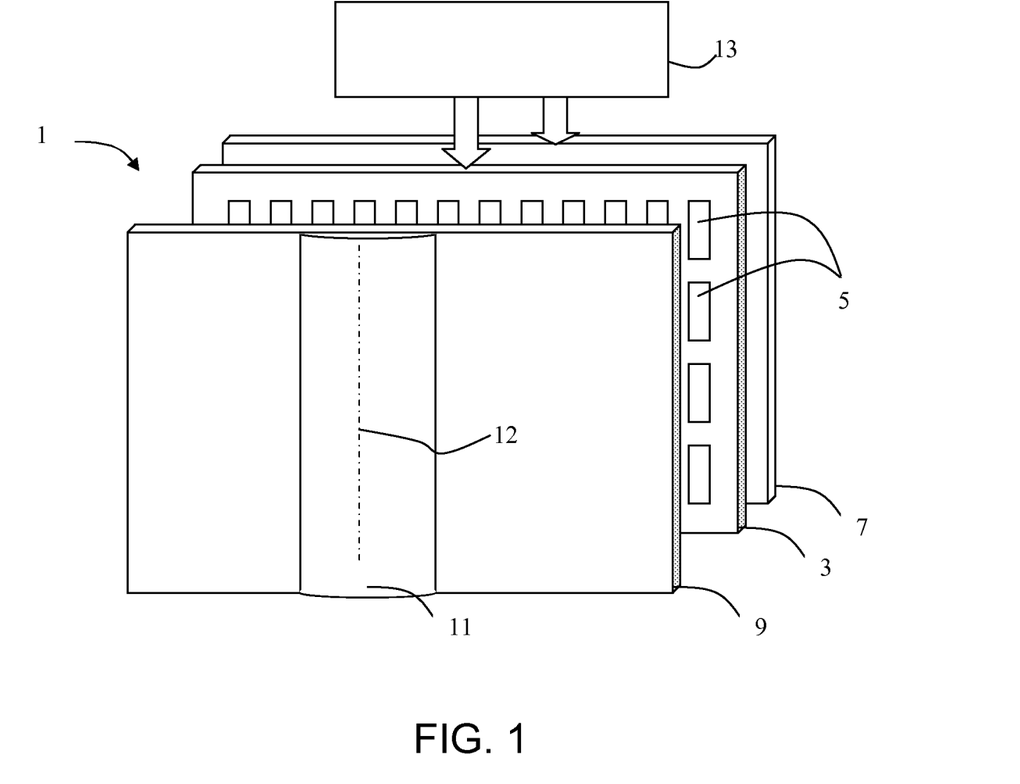
FIG. 1 is a schematic perspective view of a known autostereoscopic display device.

FIG. 1 is a schematic perspective view of a known direct view autostereoscopic display device 1 using an LCD panel to generate the images. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Fig. In practice, the display panel 3 might comprise about one thousand rows and several thousand columns of display pixels 5.

The structure of the liquid crystal display panel 3 as commonly used in autostereoscopic displays is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

In the case of an LCD panel, a light polarising means must also be used in conjunction with the above described array, since the liquid crystal material is birefringent, with the refractive index switching only applying to light of a particular polarisation. The light polarising means may be provided as part of the display panel or the imaging arrangement of the device.

Figure 2:
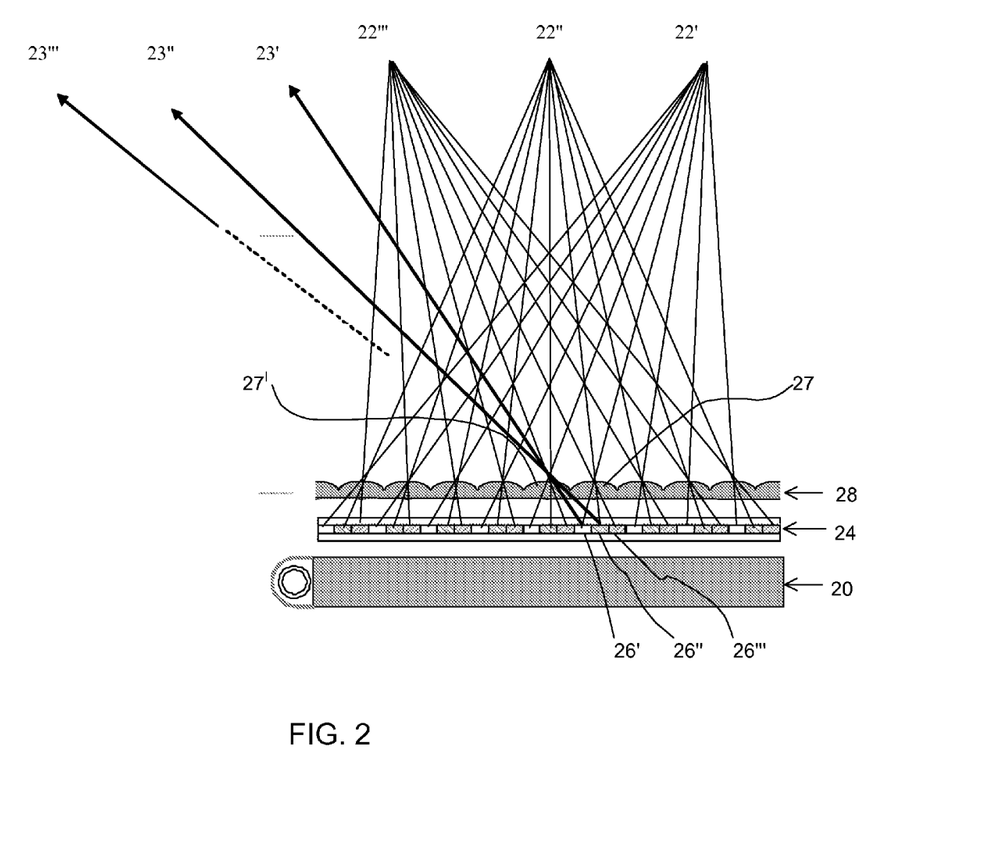
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28. FIG. 2 shows how the lenticular arrangement 28 directs different pixel outputs to three different spatial locations 22', 22", 22'". These locations are all in a so-called viewing cone, in which all views are different. The views are repeated in other viewing cones, which are generated by pixel light passing through adjacent lenses. The spatial locations 23', 23", 23'" are in the next viewing cone.

The invention is based on the use of an electroluminescent display technology, such as an OLED display, instead of the LCD display shown in FIGS. 1 and 2. The use of an OLED display avoids the need for a separate backlight and polarizers. OLED promises to be the display technology of the future.

Figure 3:
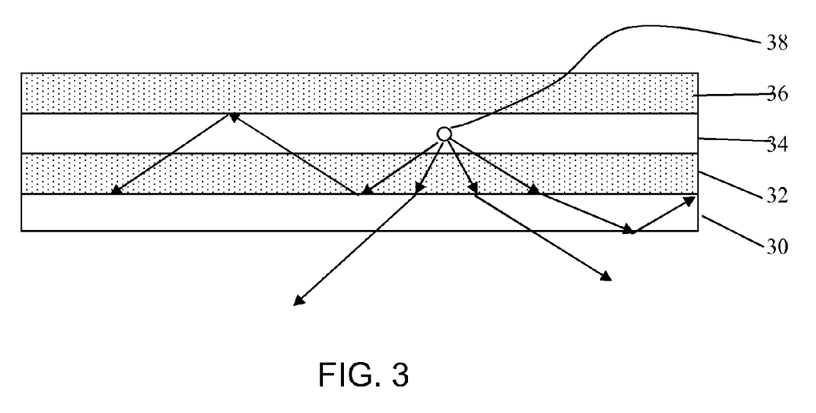
FIG. 3 schematically shows the structure of a single pixel of an OLED display, and in the form of a backward emitting structure.

FIG. 3 schematically shows the structure of a single pixel of an OLED display, and in the form of a backward emitting structure (i.e. through the substrate).

The display comprises a glass substrate 30, a transparent anode 32, a light emissive layer 34 and a mirrored cathode 36.

Whilst OLED devices are typically bottom emitting, and emit light through the glass substrate, another approach is to make the OLED stack top emitting such that the light emits through a transparent cathode (and a thin encapsulating layer) and not through the glass substrate.

When developing an auto-stereoscopic display, whether using an LCD panel or an electroluminescent display, a compromise is made when designing the lenticular lens as to which sub-pixels under the lens are in focus and which are not.

Figure 4:
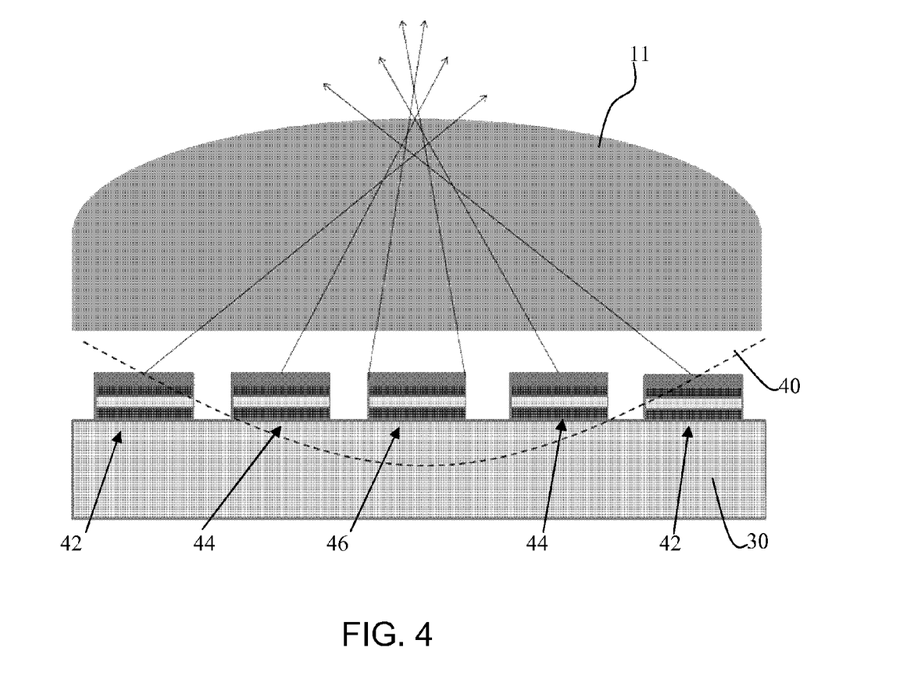
FIG. 4 shows how the lenticular lens arrangement has a focal curve which means some pixels are in focus and others are not.

This is illustrated in FIG. 4, where the line of focus 40 of the lens 11 runs above the pixels 42 at the edge of the lenticular, but below the pixels 44 and 46 at the centre of the lenticular lens 11. For this reason, only a subset of the pixels are in focus and the remainder are slightly de-focussed. In the example shown, the pixels 44 to the left and right of centre are closest to being in focus.

One approach to address this problem is to design the lenticular lenses so that they have different focus depth at different parts of their surface.

This introduces significant complexity to the design and manufacture of the lenticular lens array, so that a standard symmetrical cylindrical lens arrangement can no longer be used.

The invention provides an autostereoscopic display using OLED emitters defining or on a contoured surface, whereby the height of the OLED emitter relative to the display surface is position dependent. Preferably, the OLED emitters are positioned at a height following a concave contoured surface and positioned directly under the (convex) lenticular lens, in a way that all emitters can be brought into focus simultaneously.

The path of the focal curve 40 shown in FIG. 4 can be determined by standard optical techniques, and this can be used to derive the ideal surface contour of the pixel array. The curved surface 40 is symmetrical around the optical axis. The radius of this surface, which can be approximated as a portion of a cylinder in the case of a lenticular lens, is usually called the "field curvature".

In paraxial (small angle) approximation, with zero astigmatism, an optical surface forms a curved image surface of a radius given by:

$$R_p = \frac{nR}{n-n'}$$

with n and n' being the indices of incidence and refraction, respectively, and R the optical surface radius of curvature. The radius of curvature Rp is called the Petzval radius of curvature, or Petzval surface.

In a multi-surface optical system, the curvatures induced by each surface combine into a final system Petzval surface radius Rps, that can be either curved or flat. The curvatures for each surface simply add up as:

$$\frac{1}{R_p} = -n'_1 \sum \left(\frac{n'-n}{n'nR_p}\right)_i$$

For a single lens, this can be can be simplified to:

$$R_p = -nf$$

where n is the glass refractive and f the lens focal length (at infinity focus; for closer objects, f is replaced by image-to-objective separation).

The above formula gives the desired position of the OLED emitters from the surface.

Figure 5:
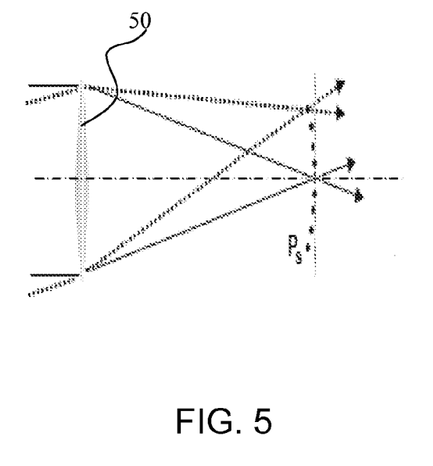
FIG. 5 is used to explain how the shape of the focal curve can be derived.

FIG. 5 shows the Petzval surface $P_S$ for a convex objective lens 50.

Lenses usually do suffer from some astigmatism, resulting in an altered best image surface, but this can also be modelled.

Figure 6:
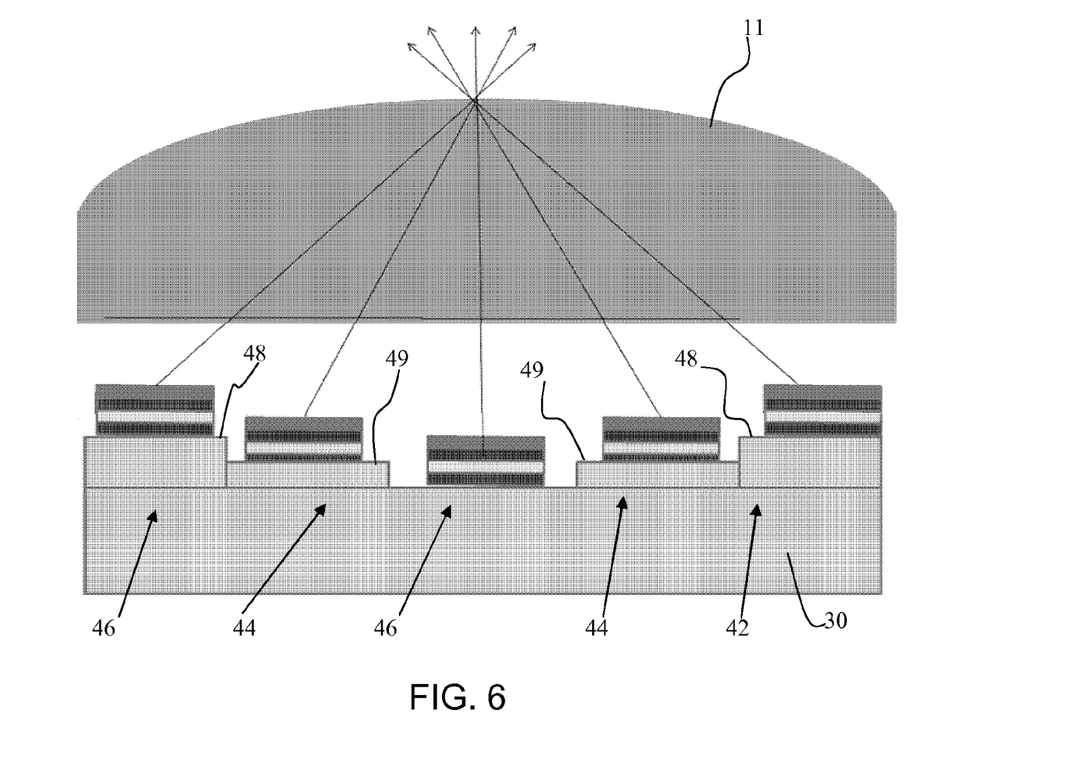
FIG. 6 shows a first example of pixel structure in accordance with the invention.
Figure 7:
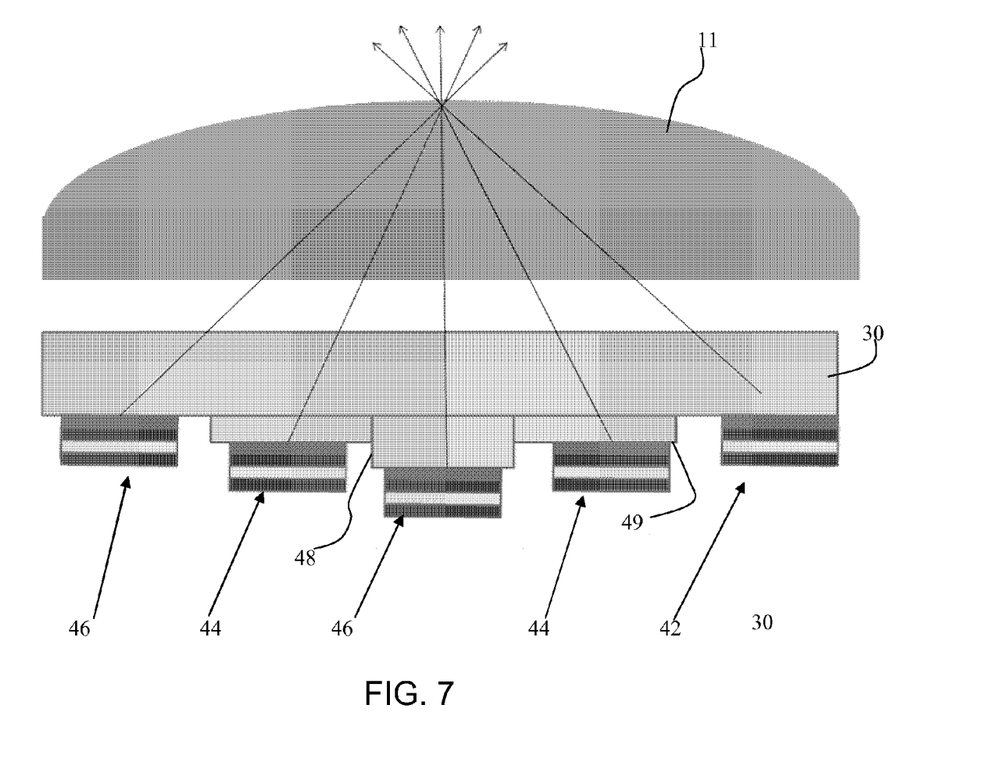
FIG. 7 shows a second example of pixel structure in accordance with the invention.

FIG. 6 shows an example of top emitting OLED display having emitters at different heights relative to the display surface, in accordance with the invention, and FIG. 7 shows an example of bottom emitting OLED display having emitters at different heights relative to the display surface, in accordance with the invention. FIGS. 6 and 7 are not drawn to scale: typically, the offset required will typically be of the order of ones or tens of microns, whereas the lateral dimension of the individual pixels is the order of tens or hundreds of microns. The offset (i.e. maximum height difference) may be below 1 micron, but it is typically more than 1% of the lateral pixel pitch.

FIG. 6 again shows the width of the lenticular lens 11 covering five pixels; two outer pixels 42, two intermediate pixels 44 and a central pixel 46. The pixels are arranged with three different heights with respect to the substrate 30, and symmetrically around the central elongate axis plane (normal to the substrate) of the lenticular lens. In the case of a top emitting structure, the offset height increases towards the edge of each lenticular lens. The display pixels are between the substrate 30 and the lenticular lens 11.

The pixels are positioned on a curve which corresponds to the Petzval surface of the lenticular lens. In an ideal design, all pixels are therefore in focus, so that the lenticular lens images the different focused pixels to infinity in different directions, with the direction determined by the lateral position of a pixel with respect to the lens central elongate axis.

For a top emitting structure, the layers over the substrate 30 comprise an array of reflective anodes over the substrate, an array of electroluminescent layer portions over the anodes, and an array of transparent cathodes over the electroluminescent layer portions, with the autostereoscopic lens arrangement provided over cathodes.

FIG. 7 shows an implementation for a bottom emitting OLED display, again with the OLED emitters positioned at different heights relative to the surface.

The same reference numbers are used as in FIG. 6. The display substrate in this case is between the OLED pixels and the lenticular lens. Thus, the spacing between the substrate and the pixels decreases towards the edge of each lenticular lens. The pixels are in the same locations with respect to the lenticular lens as in the example of FIG. 6, namely they follow the Petzval surface.

For a bottom emitting structure, the layers over the substrate 30 comprise a transparent anode, the light emitting layer and a mirrored cathode. A thin film cover layer and getter material can cover the cathode. In this design, light is emitted through the substrate 30 before passing through the lenticular lens 11.

For manufacturing, the height offset for both examples may be realised in several manners:
  (i) A planar OLED sheet can be deformed into the desired profile, for example by laminating a flexible or conformal OLED sheet (such as realised using a plastic (polyimide) or metal foil substrate) on a more rigid pre-formed substrate of the desired shape.
  (ii) The OLED layers can be deposited on a pre-formed substrate. The size of the surface topography required is limited as explained above, so that both evaporation techniques (as used for OLED deposition) and conventional surface processing techniques (such as spin coating) can be used.
  (iii) A standard glass substrate can be used and a photoresist (such as SU8) or a dielectric layer (SiO2), or a combination thereof can be employed to form offset spacers. FIG. 6 shows this approach schematically, with two different size spacers shown as 48 and 49. The formation of layers of suitable materials within display processing is well known, for example for field shielded pixels, for transflective LCDs where the cell has two different LC cell gaps, and for generating printing dams for polymer OLED displays.

In comparison to the known OLED display of FIG. 4, the display according to the invention brings all pixels below the lenticular lens into focus. The spacing between the substrate and the emitter is varied in a repeating manner across the lenticular lenses.

The display can comprise any electroluminescent display technology, such as PLEDs (polymer LEDs) or OLEDs (organic LEDs).

The technology used to form the display pixels is not changed by implementing the invention. Similarly, the lenticular lens design is not altered. Instead, the offsets are used to modify the pixel layout to be suitable for the lenticular design.

As mentioned above, the height offset is a fraction of the pixel width, so that the processing is not complicated. For example, the maximum height of the offset may be less than 30% of the pixel width. The maximum offset may be in the range 2% to 20% of the pixel width.

The display will typically comprise an active matrix display, with drive electronics associated with each display pixel, for switching a drive current to selected pixels. This can be carried out in routine manner and is not affected by the invention. For this reason, the drive electronics is not shown or described in detail. The connections to the pixel anodes and cathodes need to step up the height differences, or else vias can be used to connect to the different-height pixel terminals.

The examples above have five pixels under the width of the lens. The number of pixels beneath each lens dictates the number of viewing cones of the display, and there may be more or less, for example 3, 9 or 11.

There are at least two pixels per lens width. Even when there are only two pixels per lens width (which corresponds to a two-view, single stereoscopic image, display) different pixel heights are desired, if the two pixels are not symmetrically placed under the lens. This is generally the case, other than at the centre of the display, when viewing distance correction is applied. This involves adjusting the relative positioning between the pixels and lenses across the width of the display, so that the projected views converge to a desired focal distance and location. The pixel pitch is slightly larger than the lens pitch, so that the pixels effectively wrap around the lenticular screen to create the pair of views in the ideal viewing direction.

There can be at least three pixels per lens width for a multi-view system. In this case, different heights are needed even if all pixels are symmetrically placed under the lenticular lenses. For three pixels per lens pitch, only two heights are needed. Generally, for an integer number N of pixels per lens with (so that the lens pitch is N times the pixel pitch), a number of different pixel heights of N/2 (for even N) or (N+1)/2 (for odd N) is needed without viewing distance correction.

The lens pitch can be a non-integer multiple of the pixel pitch, and in this case the viewing cones are distributed over adjacent lenses.

These possibilities will all be well known to those skilled in the art.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
    an electroluminescent display arrangement comprising an array of spaced pixels disposed over a substrate;
    an autostereoscopic lens arrangement comprising a plurality of lenticular lenses disposed over the display arrangement,
    wherein a sub-set of the pixels in the array is provided beneath each lenticular lens, with at least two pixels across the lens width direction,
    wherein the pixels across the lens width direction are arranged with at least two different heights over the substrate.

2. The display as claimed in claim 1, wherein the sub-set of pixels beneath each lenticular lens comprises at least three pixels across the lens width direction.

3. The display as claimed in claim 1, wherein the pixels are positioned at heights corresponding to the focal surface of the lenticular lens.

4. The device as claimed in claim 1,
    wherein the lenticular lenses extend in a pixel column direction,
    wherein each lens covers a plurality of pixel columns.

5. The device as claimed in claim 1, wherein the height difference between the highest pixel over the substrate and the lowest pixel over the substrate is:
    less than 30% of the pixel width in the lenticular lens width direction.

6. The device as claimed in claim 1, wherein the electroluminescent display arrangement comprises an array of reflective anodes over the substrate, an array of electroluminescent layer portions over the anodes, and an array of transparent cathodes over the electroluminescent layer portions.

7. The device as claimed in claim 6, wherein the electroluminescent portions are between the substrate and the lens arrangement.

8. The device as claimed in claim 1, wherein the electroluminescent display arrangement comprises an array of transparent anodes over the substrate, an array of electroluminescent layer portions over the anodes, and an array of reflective cathodes over the electroluminescent layer portions.

9. The device as claimed in claim 8, wherein the substrate is between the electroluminescent portions and the lens arrangement.

10. The device as claimed in claim 1, wherein the substrate is planar and the device comprises spacers between at least some of the pixels and the substrate to define the different heights.

11. The device as claimed in claim 1, wherein the substrate has a non-planar shape thereby to define the different heights.

12. A method of displaying autostereoscopic images, comprising:
  generating a pixellated image using an electroluminescent display arrangement comprising an array of pixels spaced over a substrate; and
  directing different sub-images to different directions using an autostereoscopic lens arrangement comprising a plurality of lenticular lenses disposed over the display arrangement, wherein a set of pixels is provided beneath each lenticular lens, with at least two pixels across the lens width direction,
  wherein the method further comprises positioning the pixels across the lens width direction with at least two different heights over the substrate.

13. The method as claimed in claim 12, comprising positioning the pixels at heights corresponding to the focal surface of the lenticular lens.

14. A method manufacturing an autostereoscopic display device, comprising: forming an electroluminescent display arrangement comprising an array of pixels spaced over a substrate;
  providing an autostereoscopic lens arrangement comprising a plurality of lenticular lenses over the display arrangement, wherein a set of pixels is provided beneath each lenticular lens, with at least two pixels across the lens width direction, wherein the method comprises arranging the pixels across the lens width direction with at least two different heights over the substrate.

15. The method as claimed in claim 14, wherein the different heights are provided by:
  providing spacers between at least some of the pixels and a planar substrate; or
  forming the electroluminescent display arrangement over a contoured substrate; or
  forming the electroluminescent display arrangement over a planar substrate and subsequently forming a contour.

16. The device as claimed in claim 1,
  wherein the lenticular lenses are inclined at an acute angle to the pixel column direction,
  wherein each lens covers a plurality of pixel columns.

17. The device as claimed in claim 1,
  wherein the height difference between the highest pixel over the substrate and the lowest pixel over the substrate is more than 1% of the pixel width in the lenticular lens width direction.

* * * * *